United States Patent
Kaschel

(10) Patent No.: US 6,569,538 B1
(45) Date of Patent: May 27, 2003

(54) SYMMETRICALLY STRUCTURED, MULTI-LAYERED FILM

(75) Inventor: Gregor Kaschel, Bomlitz (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/743,027

(22) PCT Filed: Jun. 29, 1999

(86) PCT No.: PCT/EP99/04479

§ 371 (c)(1),
(2), (4) Date: Jan. 3, 2001

(87) PCT Pub. No.: WO00/02724

PCT Pub. Date: Jan. 20, 2000

(30) Foreign Application Priority Data

Jul. 10, 1998 (DE) .......................... 198 30 977

(51) Int. Cl.⁷ ........................ B32B 27/08; B65D 65/40
(52) U.S. Cl. ................ 428/475.8; 428/215; 428/216; 428/476.1; 428/476.3; 428/476.9; 428/516; 428/520

(58) Field of Search .................. 428/213, 215, 428/216, 475.8, 476.1, 476.3, 476.9, 516, 520

(56) References Cited

U.S. PATENT DOCUMENTS

| | | | |
|---|---|---|---|
| 4,601,930 A | 7/1986 | Engelsberger | 428/36 |
| 4,909,726 A | 3/1990 | Bekele | 428/34.3 |
| 5,419,795 A | 5/1995 | Wood et al. | 156/184 |

FOREIGN PATENT DOCUMENTS

| | | |
|---|---|---|
| DE | 3618775 | 12/1987 |
| EP | 0 219 329 | 4/1987 |
| EP | 0 613 774 | 5/1997 |

*Primary Examiner*—D. S. Nakarani
(74) *Attorney, Agent, or Firm*—Norris McLaughlin & Marcus

(57) ABSTRACT

A thermoformable, multi-layered, symmetric, coextruded film having no tendency to roll up, is described. The coextruded film contains layers of polyamide and polyolefin or copolymers based on olefins.

10 Claims, 1 Drawing Sheet

SYMMETRICALLY STRUCTURED, MULTI-LAYERED FILM

FIELD OF THE INVENTION

Figure 1:
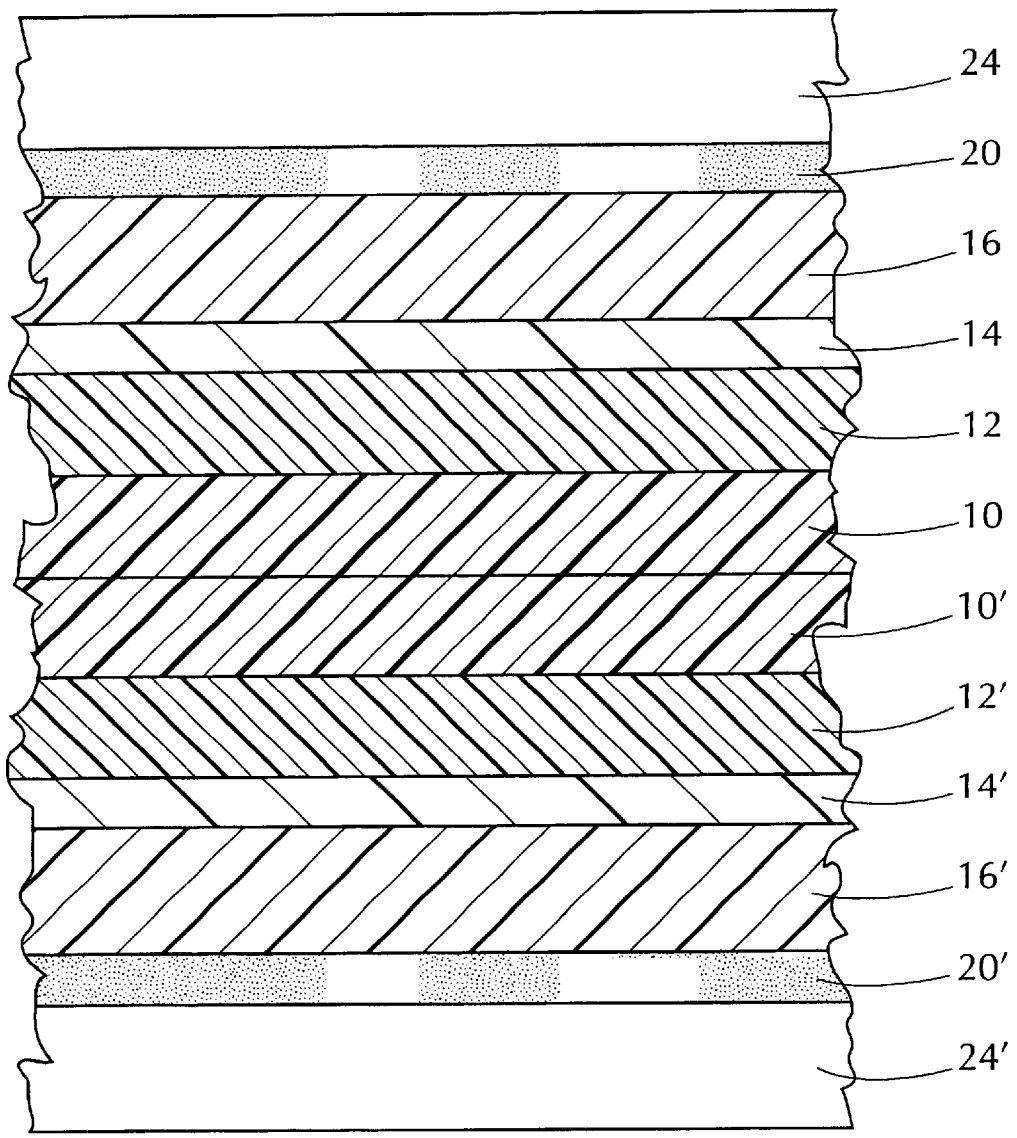

The present invention provides thermoformable, multi-layered, symmetric, coextruded films containing polyamides, polyolefins or copolymers based on olefins. These films are particularly suitable for extreme thermoforming applications with low moulding temperatures which require very high puncture-resistance. Since the film according to the invention is completely symmetric, it has no tendency to roll up. This is an important criterion for plastics packaging in order to be able to present the packages attractively in cash-and-carry outlets.

BACKGROUND OF THE INVENTION

To simplify the discussion of the prior art and the invention, the polymers which are used for films in the area of the present invention and the abbreviations used for these polymers for use in the rest of the description are explained in more detail in the following. If specific polymers are mentioned here, then these are suitable for the corresponding layers in the film according to the invention.

Polyamides (abbreviated to "PA") are understood in the widest sense to be polymeric compounds which are linked together by the acid amide group R—NH—CO—R'. Two groups of polyamides are differentiated: those built up from one parent substance by polycondensation of ω-aminocarboxylic acids or polymerisation of their lactams to give polyamide-6 type compounds and those which are produced from two parent substances, diamines and dicarboxylic acids by polycondensation to give polyamide-66 type compounds. In addition, copolyamides are also known, these being a combination of the types of polyamide mentioned.

Polyolefins are collectively summarised as "PO". Examples of polyolefins are low density polyethylene (LDPE), high density polyethylene (HDPE), linear low density polyethylene (LLDPE), polypropylene (PP), polyisobutylene, polybutylene and all other polymers which are prepared from olefins.

Furthermore, PO here also includes olefin copolymers consisting of olefins and other monomers, wherein the olefins predominate in the composition. These are, for example, ethylene copolymers with unsaturated esters (e.g. vinyl acetate) and ethylene copolymers with unsaturated carboxylic acids or their salts.

"PP" is used for polypropylene, no matter what the spatial arrangement of the methyl side-groups. "EPC" is used for copolymers of propylene with 1–10 mol. % of ethylene, wherein the ethylene is randomly distributed in the molecule.

"LDPE" is used for low density polyethylene which has a density in the range 0.86 to 0.93 g/cm$^3$. LDPE molecules are characterised by a high degree of branching.

"LLDPEs" are linear low density polyethylenes which contain, apart from ethylene, one or more α-olefins with more than 3 carbon atoms as comonomers. The following are mentioned here as representative of α-olefins: butene-1, hexene-1,4-methylpentene-1 and octene-1. By polymerisation of the substances mentioned, the typical molecular structure of LLDPEs is produced, which is characterised by a linear main chain with side chains attached thereto. The density varies between 0.86 and 0.935 g/cm$^3$. The melt flow index MFI is normally between 0.3 and 8 g/10 min. In some publications, linear ethylene/α-olefin copolymers are subdivided into VLDPEs and ULDPEs, in accordance with the density. Since, however, according to GNAUCK/FRÜNDT (Einsteig in die Kunststoffechemie Hanser-Verlag 1991, p. 58), the properties, processing and use of these copolymers corresponds largely to those of ethylene homopolymers, the more precise differentiation is not used here.

"HDPE" is used to describe linear polyethylenes of high density which have only a small degree of branching in the molecular chain. The density of HDPE may be between 0.9 g/cm$^3$ and 0.97 g/cm$^3$.

"mPE" is used here to describe an ethylene copolymer which was polymerised using metallocene catalysts. An α-olefin with four or more carbon atoms is preferably used as a comonomer. The polymers prepared using conventional Ziegler-Natta catalysts frequently contain higher concentrations of the α-olefins in the lower molecular weight fractions. As a result of the very uniform catalytic effect of metallocene centres, narrow distributions of molecular weights are found and, during fractionation, very uniform incorporation of the α-olefins in both the high and also the low molecular weight fractions. The density is preferably between 0.900 and 0.930 g/cm$^3$. The molecular weight distribution $M_w/M_n$ is less than 3.5, preferably less than 3.

"EAA" is used for copolymers consisting of ethylene and acrylic acid and "EMAA" for copolymers consisting of ethylene and methacrylic acid. The ethylene content is preferably between 60 and 90 mol. %.

"I" is used to describe olefin-based copolymers in which the molecules are cross-linked via ionic bonding. Ionic cross-linking is reversible, which results in breaking up of the ionic cross-linking at conventional processing temperatures (180° C. to 290° C.) and fresh formation in the cooling phase. Copolymers of ethylene and acrylic acid, which are cross-linked with sodium or zinc ions, are normally used as polymers.

"EVA" is used for a copolymer consisting of ethylene and vinyl acetate. The ethylene content is preferably between 60 and 99 mol. %.

"HV" is used for coextrudable, adhesion-promoting polymers (bonding agents). In contrast, adhesives are understood to be non-metallic materials, including polymers, which can bond two layers of film due to surface adhesion and internal strength without substantially altering the structure of the bonded film layers. In contrast to bonding agents, adhesives are not coextrudable, but have to be applied separately by surface application (e.g. lamination) or liquid application. Bonding agents are preferably modified polyolefins such as e.g. LDPE, LLDPE, mPE, EVA, EMAA, PP, EPC which are grafted with at least one monomer from the group of α,β-monounsaturated dicarboxylic acids such as, for example, maleic acid, fumaric acid, itaconic acid or their acid anhydrides, acid esters, acid amides or acid imides. Other extrudable bonding agents which may be used are also copolymers of ethylene with α,β-monounsaturated monocarboxylic acids such as acrylic acid, methacrylic acid and/or their metal salts with zinc or sodium and/or their $C_1$–$C_4$-alkyl esters, which may also be grafted with at least one monomer from the group of α,β-monounsaturated dicarboxylic acids such as, for example, maleic acid, fumaric acid, itaconic acid or their acid anhydrides, acid esters, acid amides or acid imides. In addition, polyolefins such as e.g. polyethylene, polypropylene, ethylene/propylene copolymers or ethylene/α-olefin copolymers which are grafted with copolymers of ethylene with α,β-monounsaturated monocarboxylic acids such as acrylic acid, methacrylic acid and/or their metal salts with zinc or sodium and/or their $C_1$–$C_4$-alkyl esters, may be used. Particularly suitable bonding agents are polyolefins, in particular ethylene/α-olefin copolymers with grafted α,β-monounsaturated dicarboxylic anhydrides, in particular maleic anhydride. HVs may also contain an ethylene/vinyl acetate copolymer, preferably with a vinyl acetate content of at least 10 wt. %.

Different layers in a film are separated in the following by "/". Mixtures of polymers in a layer are signified by round brackets and linked by a "+". Thus the film structure " . . . /LLDPE/(mPE+LDPE)" describes a multi-layered film, wherein the outer layer contains a mixture of mPE and LDPE. The inner layer consists of LLDPE. The other layers in the film are indicated by " . . . ".

The following documents are regarded as the relevant prior art for the present invention:

DE 3 216 097 C3 describes a process for a two-layered blown film consisting of polyethylene and ethylene copolymers which is prepared by blocking of the inner layer. The inner layer consists of an ethylene/vinyl acetate copolymer or ethylene/methacrylic acid copolymers which are partly cross-linked with ions of sodium or zinc. The ethylene/vinyl acetate copolymer contains up to 30 wt. % of vinyl acetate, preferably 3 to 10 wt. % of vinyl acetate. This film is laminated with a monolayered or multilayered support film and is characterised by its elevated puncture-resistance, planarity and wear properties with regard to metal. EP 0 219 329 B1 describes a multi-layered, coextruded film with a very high oxygen barrier effect. This is a 7-layered blown film which is prepared by blocking the inner layer, consisting of an ethylene/vinyl acetate copolymer with itself. The film does not contain any polyamide, rather EVOH and PVDC as barrier layers.

EP 0 613 774 A1 describes a multi-layered film based on polyamide and olefinic polymers or copolymers which has the main structure PA*/PE*/PA/PE. Each of these four layers can in turn consist of several layers of the same type, E.g. PA* may consist of various PA6/PA6/12/PA6s. The same applies to the PE layers; e.g. PE** may consist of two layers of an extrudable bonding agent (HV) and LDPE as a sealing layer.

U.S. Pat. No. 4,909,726 describes a multilayered film consisting of a blown film which contains a an inner layer which can seal to itself consisting of a modified polyethylenic bonding agent. Furthermore, the film contains two polyamide layers, between which is embedded an EVOH layer. The film is preferably produced as a blown tubular film, wherein the inner layers are welded to each other. Films of this type are suitable in particular for vertical moulding and filling sealing machines in which the fill is shaped to give a tube. The longitudinal seam is prepared with heat-sealing bars, the ends of the tube are clipped. The film described exhibits very high impact-resistance. Filled packages are allowed to fall from various heights and the number of packages which break open is recorded. This type of impact strain is not comparable with the completely different type of strain due to pointed or sharp-edged items which puncture the film.

All the films in accordance with the prior art exhibit the common features that they are not sufficiently thermoformable, they do not have a low tendency to roll and they are not puncture-proof.

SUMMARY OF THE INVENTION

Thus, there is the object of providing a film with improved puncture resistance
thermoformability and
a low tendency to roll.

This is achieved in accordance with the invention by the coextruded, symmetrically structured film shown schematically in FIG. 1, in particular for thermoforming applications, which consists of at least the following layers:

a) two outer layers 24 and 24' consisting of polyolefins or olefin copolymers or a mixture of these polymers and optionally conventional lubricants and/or antiblocking agents, b) two adjoining inner layers 10 and 10' consisting of polyolefins or olefin copolymers or a mixture of these polymers, the melting point of which is lower than 100° C., and optionally conventional additives, c) two inner layers 16 and 16' which contain a polyamide or a mixture of different polyamides, d) an inner layer 14 adjacent to inner layers 12 and 16 and an inner layer 14' adjacent to inner layers 12' and 16', which contain an adhesion-promoting polymer, e) an inner layer 20 adjacent to inner layers 24 and 16 and an inner layer 20' adjacent to 24' and 16', which contain an adhesion-promoting polymer, f) two inner layers 12 and 12', adjacent to inner layers 10 and 10' respectively, containing a polyolefin or olefin copolymer or a mixture of these polymers with a melting point higher than that of inner layers 10 and 10'.

DETAILED DESCRIPTION OF THE INVENTION

The film according to the invention can be extruded on all conventional extrusion devices on which polyamide or polyolefins can be processed.

Outer layers 24 and 24' contain polyolefins or olefin copolymers or a mixture of these polymers, preferably polyethylene or ethylene copolymers, ethylene copolymers with unsaturated carboxylic acids or their salts or mixtures of these polymers. LDPE, LLDPE, mPE, I, HDPE, PP, EPC or mixtures of these polymers are particularly preferably used. To improve the surface slip, lubricants and antiblocking agents may be added. The amount of lubricant in layers 24 and 24' should be between 50 and 2000 ppm, depending on the thickness of the layer. The concentration of antiblocking agent in layers 24 and 24' should be between 50 and 3000 ppm, preferably between 100 and 2000 ppm. Inner layers 16 and 16' preferably contain PA6, PA11, PA12 and PA66 or copolyamides based on these or mixtures of these polymers as a polyamide. Copolyamides are e.g. PA6/66, PA6/12, PA6/6I, PA6/IPDI, PA66/610, PA6/11/66. To improve the oxygen barrier effect or the thermoformability, these polyamides may be mixed with partly aromatic PAs such as e.g. PA6I/6T, PAMXD6, PA6I.

The inner layers consisting of PA may be modified with additives. Suitable additives are e.g. crystallisation agents, lubricants and processing aids.

Furthermore, the polyamides may be modified by sheet-like particles. The sheet-like particles may consist of organic or inorganic substances. The characteristic diameter of the particles is understood to be the longitudinal length of the particle, which is usually less than 700 nm. The oxygen barrier effect or the tensile strength of the film, for example, can be improved by adding these particles.

Inner layers 14 and 14' and 20 and 20' contain an extrudable bonding agent. Modified polyolefins or olefin copolymers are preferably used as these. The use of polyolefins or olefin copolymers grafted with unsaturated dicarboxylic acids is particularly preferred.

Inner layers 12 and 12' consist of polyolefins or olefin copolymers or mixtures of these polymers. The melting point of layers 12 and 12' is higher than that of layers 10 and 10' and is preferably lower than 120° C. Inner layers 12 and 12' adhere to inner layers 10 and 14 or 10' and 14' respectively; an additional adhesion-promoting layer is not required.

Inner layers 10 and 10' preferably consist of copolymers of ethylene and ethylenic copolymers or mixtures of these polymers, in particular EVA, with a melting point of preferably less than 90° C.

In a particular embodiment of the invention, a further inner layer is placed between inner layer 16 and adhesion-promoting inner layer 20 and between inner layer 16' and adhesion-promoting inner layer 20', this consisting of polyamide or EVOH. This may, be expedient, for example, in order to improve the thermoforming properties and barrier characteristics of the film to gases or radiation. The oxygen permeability has been demonstrated to be especially critical and this frequently has to be reduced.

Another factor is the transmission of radiation, in particular ultraviolet radiation (from 200 to 380 nm). It has been shown that specific types of PA can absorb specific wavelengths of UV light and thus are better able to protect sensitive products such as e.g. meat. EVOH would considerably improve the barrier effect of the film, in particular towards oxygen, if the oxygen barrier effect achievable with PA is not sufficient.

In another particular embodiment, a further inner layer consisting of PO may be placed between inner layers 20 and 24 and between inner layers 20' and 24'. This may be expedient, for example, in order to improve the sealing properties or optical properties of the film. Care should be exercised to ensure that these additional inner layers adhere to inner layers 20 and 24 or 20' and 24'. Only then can the typical sealing strength required for packaging be achieved.

Films with the structure in accordance with the invention are suitable in particular for thermoforming applications. Thermoforming is understood to be the shaping of a film or sheet which is pressed or drawn into a pre-shaped mould, after warming, by means of a compressed air differential or a piston. During the thermoforming process, the rectangular relationship of the film thickness decreases in accordance.

Films with the structure according to the invention are also suitable for applications known as lap-seals. Here outer face 24 is sealed with outer face 24'. Since both outer faces have the same polymeric composition, a good seal should result.

Films with the film structure according to the invention are suitable for packing a wide variety of goods, whether they are present as one or more solid or liquid phases or a combination of the phases mentioned. They are suitable for packaging cold or hot products. They are very particularly suitable for sharp-edged goods because the puncture-resistance of films according to the invention offers special protection to the goods being packaged.

To improve the surface slip properties, conventional lubricants and antiblocking agents may be added to the film. Examples of known antiblocking agents are solid organic or inorganic particles which project from the outer surface of the sealing layer and improve the sliding behaviour of the film in this way. Examples of suitable compounds are silicon dioxide, calcium carbonate, magnesium silicate, aluminium silicate, calcium phosphate, talcum and the like. Of these, silicon dioxide is preferably used. Known organic antiblocking agents are, for example, incompatible polymers such as polyester or polycarbonate. Active amounts are in the range 0.05 to 2 wt. %, preferably 0.1 to 0.9 wt. %. The average particle size is between 1 and 10 $\mu$m, wherein here particles with a spherical shape are particularly suitable. These particles are preferably used in only one of or both outer layers.

Other additives which improve the surface slip properties of the films, also when combined with the solid particles mentioned, are the substances usually called lubricants such as higher aliphatic acid amides, higher aliphatic acid esters, waxes, metal soaps and polydimethylsiloxanes or other substances such as, for example, are mentioned in Otto Piringer: Verpackungen für Lebensmittel, VCH Verlagsgesellschaft 1993, p. 53. The active amount of lubricant is in the range 0.01 to 3 wt. %, preferably 0.02 to 1 wt. %. The addition of higher aliphatic acid amides in the range 0.01 to 0.25 wt. % is particularly suitable. An aliphatic acid amide which is suitable in particular for the outer layers is erucic amide.

The total concentration of lubricant in the film should not exceed 1000 ppm. With thicker films, lower absolute concentrations of lubricant should be striven for, since otherwise increased deposition of the lubricant at the surface of the film has to be expected. In the extreme case, optically detectable specks consisting of lubricant may appear on the film.

One or more layers in the film according to the invention may be coloured.

Films according to the invention may contain further additives such as antifog agents or antistatic agents. Known antistatic agents are, according to Hans Domininghaus: Die Kunststoffe und ihre Eigenschaften, VDI-Verlag, 1992, Düsseldorf, p. 23, the so-called internal antistatic agents ethoxylated tertiary amines of fatty acids or ethoxylated glycol esters of fatty acids or else the external antistatic agents quaternary ammonium salts of fatty acids. Surface active substances which prevent the coating of the film surface with fine water droplets are called antifog agents or also antimist agents. Known antifog agents are, for example, glycerol esters of fatty acids or polyoxyethylenesorbitane monooleate.

Outer layers 24 and 24' may be specified as a peel layer. A known process for achieving the peel effect is the addition of polybutylene to polyethylene or ethylenic copolymers such as are described in Ahlhaus: Verpacken mit Kunststoffen, Carl Hanser Verlag, 1997, p. 239.

The total thickness of the film should be a maximum of 500 $\mu$m, preferably less than 350 $\mu$m. The thickness of the polyamide layer, with respect to the total thickness of the film, should preferably not exceed 40%. If the film contains EVOH, then the sum of the thicknesses of the EVOH layers, with respect to the total thickness of the film, should preferably be less than 10%, particularly preferably less than 7%. The sum of the thicknesses of all the bonding agent layers, with respect to the total thickness of the film, should be less than 30%, particularly preferably less than 15%.

Methods of Measurement

Puncture-resistance was used to assess films which are subjected to attack by pointed items. Puncturing work is the work required in order to pierce a stretched-out, membrane-like film. A circular sample with a diameter of 80 mm is taken from a film sample and inserted like a membrane into the sample-holder in an electronic tensile testing machine. The sample-holder has a free diameter of 50 mm. The puncturing work is determined from the integral of the force times the pathlength which is required to pierce the sample. It is cited as N*cm. The test spike had a cone ground down to less than 90° with a diameter of 1 mm at its tip. The sample is pierced at a speed of 100 mm/min.

Thermoforming Tests

On a horizontal thermoforming machine (Tiromat 3000 from the Alfa Laval Co.) the films are subjected to a test approximating to the real situation. The thermoforming behaviour of the films at a thermoforming temperature of 90° C. is tested. The heating and shaping time is 3 seconds. The size of the shaped part is 184 mm×114 mm (width× length), wherein the thermoforming depth is increased by 5 mm at a time until the film tears during the thermoforming process. The greatest depth at which the film does not tear is recorded.

Tendency to Roll

The test was used to determine the tendency to roll of a free, not intentionally guided strip of film. It is measured at 23° C. and 50% relative humidity. The film should be at ambient temperature. For this test, a round section of film with a diameter of 118 mm is laid out so that the ends of the film can freely roll upwards. The distance of the end projecting to the greatest extent from the plane is measured. If the end of the film has rolled up by less than 5 mm, then no tendency to roll is recorded. If the sample rolls up more strongly, then a low tendency to roll is recorded. If the sample rolls up so much that it is no longer possible to measure the height, because the free ends have rolled one inside the other, then a high tendency to roll is recorded.

Determining the Melting Point of Plastics Films with the Melt Table Microscope

The test method is used to determine the melting point of one layer in a plastics film. The melting point is understood to be the temperature at which the crystal lattice breaks down under atmospheric pressure. The samples being measured (a microtome section from the film) is heated on a heating table and observed through a microscope using polarised transmitted light. If the film layer consists of a partly crystalline, double refracting plastic material, it loses this property at the time it melts, which can be observed using polarised light with the sample inserted between crossed polarisation filters. If the film layer has too weak, or no, double refraction, then non-polarised transmitted light can be used and the temperature range over which melting onto a microscope slide takes place is observed. In most cases, the melting point can be cited with an accuracy of +/−1° C.

The data on melt flow rates refers in the following to the value determined in accordance with DIN ISO 1133. If there is no other data, the conditions of measurement are presumed to be in the form of temperature and the applied weight condition D in DIN ISO 1133, with a temperature of 190° C. and an applied weight of 2.16 kg.

The density of the raw materials refers to the method of measurement in accordance with ISO 1183 (A).

EXAMPLE 1

A multi-layered blown film with the structure EVA-1/HV-1/(95% PA6/66+5% PA6I/6T)/HV-1/(70% mPE-1+30% LDPE-1)/EVA-2/EVA-2/(70% mPE-1+30% LDPE-1)/HV-1/(95% PA6/66+5% PA6I/6T)/HV-1/EVA-1 is produced by coextrusion and bonding the halves of the film between the two EVA-2 layers. The thicknesses of the layers are 25/9/45/9/20/17/17/20/9/45/9/25 µm. EVA-1 has a density of 925 kg/m$^3$, a MFI of 2 g/10 min and contains 5 wt. % of vinyl acetate as well as lubricant and antiblocking agent. The bonding agent HV-1 is the same in all layers and is based on LLDPE grafted with maleic anhydride. PA6/66 contains about 15 wt. % of comonomer. The amorphous PA6I/6T contains the proportions of acids of about ⅔ isophthalic acid and about ⅓ terephthalic acid. The mPE-1 is a linear PE prepared with the aid of metallocene catalyst techniques and has a density of 902 kg/m$^3$ and a MFI of 1 g/10 min; the comonomer is octene-1. LDPE-1 has a density of 924 kg/m$^3$ and a MFI of 0.8 g/10 min. EVA-2 contains 25 wt. % of vinyl acetate; it has a MFI of 2 g/10 min and a melting point of about 78° C. The melting point of layers 12 and 12' (70% mPE+30% LDPE-1) is about 103° C.

EXAMPLE 2

A multi-layered blown film with the structure IHV-1/(95% PA6/66+5% PA6I/6T)/HV-1/(70% mPE-1+30% LDPE-1)/EVA-2/EVA-2/(70% mPE-1+30% LDPE-1)/HV-1/(95% PA6/66+5% PA6I/6T)/HV-1/I is produced by coextrusion and bonding the halves of film between the two EVA-2 layers. The thicknesses of the layers are the same as those in example 1. Example 2 differs from example 1 only in the outer layers. The outer layer here is an ionomer which was copolymerised with about 15 wt. % of methacrylic acid and partly neutralised with sodium ions.

EXAMPLE 3

A multi-layered blown film with the structure (50% mPE-2+50% EVA-3)/HV-2/(PA6/66)/HV-2/EVA-3/EVA-2/EVA-2/EVA-3/HV-2/(PA6/66)/HV-2/(50% mPE-2+50% EVA-3) is produced by coextrusion and bonding the halves of film between the two EVA-2 layers. The thicknesses of the layers are 34/7/36/7/17/24/24/17/7/36/7/34 µm. EVA-3 has a density of 925 kg/M$^3$, aMFI of 3 g/10 min and contains 5 wt. % of vinyl acetate. The bonding agent HV-2 is the same in all the layers and is based on a mixture of LDPE and LLDPE grafted with maleic anhydride. PA6/66 is the same as that mentioned in example 1. The mPE-2 is a linear PE prepared with the aid of metallocene catalyst techniques and has a density of 918 kg/m$^3$ and a MFI of 1 g/10 min; the comonomer is hexene-1. All the other polymers are the same as those mentioned in example 1. The melting point of layers 12 and 12' (EVA-3) is about 101° C.

Comparison Example 4

A coextruded film with the structure PA6/HV-3/(85% PA6+15% PA6I/6T)/HV-3/LDPE-2/EVA-4 is produced with layer thicknesses of 30/25/70/25/80/50 µm, wherein the two layers LDPE-2/EVA-4 are coated onto the previously prepared composite structure. The PA6 has a relative solution viscosity of 3.8 measured in m-cresol (c=10 g/l). The PA6s in the outer layer and in the inner layer are the same. The amorphous PA6I/6T is the same as that mentioned in example 1. Bonding agent HV-3 contains LLDPE grafted with maleic anhydride. LDPE-2 has a density of 915 kg/m$^3$ and a MFI of 7.5 g/10 min. EVA-4 contains 5 wt. % of vinyl acetate, has a density of 925 kg/m$^3$ and a MFI of 7 g/10 min.

Comparison Example 5

Comparison example 5 is similar to comparison example 4, but the layer thickness distribution is 30/30/70/30/100/60 μm.

|  | Film thickness [μm] | max. thermoforming depth [mm] | Tendency to roll | Puncture work [N*cm] |
| --- | --- | --- | --- | --- |
| Example 1 | 250 | 110 | none | 3.1 |
| Example 2 | 250 | 115 | none | 3.9 |
| Example 3 | 250 | 105 | none | 3.1 |
| Comp. ex. 4 | 280 | 95 | small | 2.7 |
| Comp. ex. 5 | 320 | 95 | small | 3.0 |

It is quite obvious from the table that films 1 to 3 according to the invention have no tendency to roll, can be better thermoformed and have better puncture-resistance at a greatly reduced film thickness.

What is claimed is:

1. A symmetrically structured, multi-layered film prepared by coextrusion, comprising
   a) two outer layers 24 and 24' consisting of polyolefins or olefin copolymers or a mixture of these polymers and optionally conventional lubricants and/or antiblocking agents,
   b) two adjoining inner layers 10 and 10' consisting of polyolefins or olefin copolymers or mixtures of these polymers, the melting point of which is lower than 100° C., and optionally conventional additives,
   c) two inner layers 16 and 16' which contain a polyamide or a mixture of different polyamides,
   d) an inner layer 14 adjacent to inner layers 12 and 16 and an inner layer 14' adjacent to inner layers 12' and 16', which contain an adhesion-promoting polymer,
   e) an inner layer 20 adjacent to inner layers 24 and 16 and an inner layer 20' adjacent to 24' and 16', which contain an adhesion-promoting polymer,
   f) two inner layers 12 and 12', adjacent to inner layers 10 and 10' respectively, containing a polyolefin or olefin copolymer or a mixture of these polymers with a melting point higher than that of inner layers 10 and 10'.

2. The film of claim 1, wherein outer layer 24 or 24' consists of polyethylene or ethylene copolymers, ethylene copolymers with unsaturated carboxylic acids or their salts or mixtures of these polymers.

3. The film of claim 1, wherein inner layer 10 or 10' consists of copolymers of ethylene and thylenic copolymers or mixtures of these polymers.

4. The film of claim 1, wherein inner layer 10 and 10' has a melting point below 90° C.

5. The film of claim 1, wherein the polyamide in inner layers 16 and 16' is selected from PA6, PA66, PA12, PA11, PA6/66, PA66/610, PA6/11/66, PA6/6I, PA6/6I, PA6IPDI, PA6/12, PA6I, PA6I/6T, PAMXD6 and mixtures of these polyamides.

6. The film of claim 1, wherein inner layer 20 and 20' contains polyolefins or olefin copolymers grafted with unsaturated dicarboxylic acids.

7. The film of claim 1, wherein inner layer 14 and 14' contains polyolefins or olefin copolymers grafted with unsaturated dicarboxylic acids.

8. The film of claim 1, wherein inner layer 12 and 12' consists of polyethylene or ethylenic copolymers, and the melting point of inner layer 12 and 12' is lower than 120°C.

9. The film of claim 1, wherein a further inner layer, consisting of polyamide or EVOH, adjoins each of inner layers 16 and 20 and inner layers 16' and 20'.

10. The film of claim 1, wherein a further inner layer, consisting of polyethylene or ethylenic copolymers, adjoins each of inner layers 20 and 24 and inner layers 20' and 24'.

* * * * *

UNITED STATES PATENT AND TRADEMARK OFFICE
CERTIFICATE OF CORRECTION

PATENT NO. : 6,569,538 B1
DATED : May 27, 2003
INVENTOR(S) : Kaschel

It is certified that error appears in the above-identified patent and that said Letters Patent is hereby corrected as shown below:

Column 10,
Line 11, "thylenic copolymers" should read -- ethylenic copolymers --
Line 18, "PA6IPDI" should read -- PA6/IPDI --

Signed and Sealed this

Third Day of May, 2005

JON W. DUDAS
*Director of the United States Patent and Trademark Office*